(12) United States Patent
Gundlach et al.

(10) Patent No.: US 6,258,873 B1
(45) Date of Patent: *Jul. 10, 2001

(54) INK COMPOSITIONS SUBSTANTIALLY FREE OF ORGANIC LIQUIDS

(75) Inventors: Kurt B. Gundlach, Fairport; Maura A. Sweeney, Rochester; Luis A. Sanchez, Fairport; Richard L. Colt; Melvin D. Croucher, both of Rochester, all of NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/106,621

(22) Filed: Jun. 29, 1998

Related U.S. Application Data

(63) Continuation-in-part of application No. 09/047,097, filed on Mar. 24, 1998, now Pat. No. 6,001,899, and a continuation-in-part of application No. 09/046,852, filed on Mar. 24, 1998, now Pat. No. 6,054,505.

(51) Int. Cl.$^7$ .................... C09D 11/00; C09D 11/10; C09D 11/02; C09D 139/04; C08F 226/10
(52) U.S. Cl. ................. 523/160; 523/161; 526/263; 526/264; 106/31.43; 106/31.49
(58) Field of Search .................. 523/160, 161; 106/31.27, 31.32, 31.4, 31.43, 31.47, 31.49, 31.59; 526/263, 264; 510/174

(56) References Cited

U.S. PATENT DOCUMENTS

| | | | |
|---|---|---|---|
| 4,162,983 | * 7/1979 | Johnson | 510/328 |
| 4,197,135 | 4/1980 | Bailey et al. | 106/23 |
| 4,231,841 | * 11/1980 | Calmanti et al. | 162/5 |
| 4,267,088 | 5/1981 | Kempf | 260/29.2 EP |
| 4,391,639 | * 7/1983 | Kobayashi | 106/31.52 |
| 4,659,382 | 4/1987 | Kang | 106/22 |
| 4,961,785 | 10/1990 | Skene et al. | 106/22 |
| 5,017,224 | * 5/1991 | Tomita et al. | 106/31.43 |
| 5,019,164 | * 5/1991 | Tomita et al. | 106/31.43 |
| 5,019,166 | * 5/1991 | Schwarz | 106/31.43 |
| 5,059,246 | * 10/1991 | Yamamoto et al. | 106/31.58 |
| 5,091,005 | 2/1992 | Mueller et al. | 106/22 |
| 5,116,410 | * 5/1992 | Miller | 106/31.58 |
| 5,156,675 | * 10/1992 | Breton et al. | 106/31.43 |
| 5,223,338 | * 6/1993 | Malhotra | 428/342 |
| 5,250,107 | 10/1993 | Bares | 106/20 R |
| 5,262,535 | * 11/1993 | Kaiser | 544/402 |
| 5,417,893 | * 5/1995 | Ofosu-Asante | 510/235 |
| 5,509,957 | * 4/1996 | Toan et al. | 106/31.43 |
| 5,518,534 | * 5/1996 | Pearlstine et al. | 106/31.75 |
| 5,618,338 | * 4/1997 | Kurabayashi et al. | 106/31.37 |
| 5,667,572 | * 9/1997 | Taniguchi et al. | 106/31.36 |
| 5,698,478 | * 12/1997 | Yamamoto et al. | 347/105 |
| 5,709,737 | * 1/1998 | Malhotra et al. | 106/31.43 |
| 5,746,818 | * 5/1998 | Yatake | 106/31.86 |
| 5,773,405 | * 6/1998 | Bruhnke | 510/419 |
| 5,788,750 | * 8/1998 | Gundlach et al. | 106/31.27 |
| 5,853,469 | * 12/1998 | Colt et al. | 106/31.49 |
| 6,054,505 | * 4/2000 | Gundlach et al. | 523/160 |

FOREIGN PATENT DOCUMENTS 57-198768   12/1982   (JP) .

* cited by examiner

*Primary Examiner*—Vasu Jagannathan
*Assistant Examiner*—Callie E. Shosho
(74) *Attorney, Agent, or Firm*—Judith L. Byorick

(57) ABSTRACT

Disclosed is an ink composition which comprises water, an acid dye, a monovalent salt, a polyquaternary amine compound, and an optional nonionic or cationic surfactant, said ink being substantially free of organic solvents. The ink is particularly suitable for applications such as ink jet printing and marking pens. The disclosed inks in some embodiments are substantially indelible. Also disclosed is a composition for removing the ink compositions from substrates to which they have been applied which comprises water and a dianionic surfactant, optionally further containing a salt, urea, and/or a viscosity building agent such as a gum.

90 Claims, No Drawings

INK COMPOSITIONS SUBSTANTIALLY FREE OF ORGANIC LIQUIDS

This application is a continuation-in-part of U.S. Ser. No. 09/047,097, filed Mar. 24, 1998 now U.S. Pat. No. 6,001,899, and of U.S. Ser. No. 09/046,852, filed Mar. 24, 1998 now U.S. Pat. No. 6,054,505, the disclosures of each of which are totally incorporated herein by reference.

BACKGROUND OF THE INVENTION

The present invention is directed to aqueous ink compositions. More specifically, the present invention is directed to ink compositions particularly suitable for use in applications such as ink jet printing processes and marking pens. One embodiment of the present invention is directed to an ink composition which comprises water, an acid dye, a monovalent salt, a polyquaternary amine compound, and an optional nonionic or cationic surfactant, said ink being substantially free of organic solvents.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Aqueous inks are also used in marking pens, such as felt tipped pens, roller ball pens, fountain pens, ballpoint pens, and the like for applications such as highlighters, indelible markers, writing implements, and the like. Inexpensive, ecologically friendly, and nontoxic ink compositions that dry rapidly on substrates such as paper, overhead transparencies, and certain solid surfaces are particularly desirable in these applications.

Copending application U.S. Ser. No. 09/046,895, filed Mar. 24, 1998, entitled "Ink Compositions and Multicolor Thermal Ink Jet Printing Process for the Production of High Quality Images," with the named inventor John Wei-Ping Lin, the disclosure of which is totally incorporated herein by reference, discloses a set of inks for printing multicolor images in an ink jet printer, said ink set comprising (A) a first ink having a first color and comprising water and a colorant selected from the group consisting of (1) anionic dyes, (2) dyes having physically or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; and (B) a second ink comprising water, an optional colorant having a color other than the first color, and an ammonium salt having at least two cationic ammonium functional groups, wherein the colorant in the first ink is capable of being immobilized on a printing substrate by interaction with the ammonium salt having at least two cationic ammonium functional groups in the second ink.

Copending application U.S. Ser. No. 09/047,097, filed Mar. 24, 1998, entitled "Ink Compositions With Improved Waterfastness and Smear Resistance," with the named inventors Kurt B. Gundlach, Richard L. Colt, Luis A. Sanchez, Maura A. Sweeney, and Edward J. Radigan, Jr., the disclosure of which is totally incorporated herein by reference, discloses an ink composition which comprises water, an anionic dye, and a polyquaternary amine compound selected from the group consisting of polydiallyl dimethyl ammonium compounds, polyquaternized polyvinylamines, polyquaternized polyallylamines, and mixtures thereof. Also disclosed are methods for using the aforementioned ink composition in ink jet printing processes.

Copending application U.S. Ser. No. 09/046,852, filed Mar. 24, 1998, entitled "Ink Compositions With Improved Shelf Stability", with the named inventors Kurt B. Gundlach, Luis A. Sanchez, Richard L. Colt, Maura A. Sweeney, and William M. Schwarz, the disclosure of which is totally incorporated herein by reference, discloses an ink composition which comprises (1) water; (2) a nonpolymeric salt comprising at least one cation and at least one anion; and (3) a colorant comprising an anionic dye complexed with a polyquaternary amine compound. Also disclosed is an ink composition which comprises (1) water; (2) a nonpolymeric salt comprising at least one cation and at least one anion; (3) an anionic dye; and (4) a polyquaternary amine compound. In one embodiment, the polyquaternary amine compound is selected from the group consisting of polydiallyl dimethyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

Copending application U.S. Ser. No. 09/046,849, filed Mar. 24, 1998, entitled "Ink Compositions Containing Cationic Amido Amine Polymers", with the named inventor William M. Schwarz, the disclosure of which is totally incorporated herein by reference, discloses an ink composition which comprises (1) water; (2) a dye; and (3) a cationic amido amine copolymer. Also disclosed are methods for using the aforementioned ink composition in ink jet printing processes.

Copending application U.S. Ser. No. 09/047,278, filed Mar. 24, 1998, entitled "ink Compositions Containing Vinyl Pyrrolidinone/Vinyl Imidazolium Copolymers", with the named inventor William M. Schwarz, the disclosure of which is totally incorporated herein by reference, discloses an ink composition which comprises (1) water; (2) an anionic dye; and (3) a copolymer of vinyl pyrrolidinone and a vinyl imidazolium salt. Also disclosed are methods for using the aforementioned ink compositions in ink jet printing processes.

Copending application U.S. Ser. No. 09/106,391, entitled "Ink Compositions Containing Oxy Acids or Oxy Acid Salts," with the named inventor William M. Schwarz, filed concurrently herewith, the disclosure of which is totally incorporated herein by reference, discloses an ink composition which comprises (1) water; (2) a colorant; and (3) an additive selected from the group consisting of oxy acids, oxy acid salts, and mixtures thereof. Also disclosed is a thermal ink jet printing process employing the ink.

Copending application U.S. Ser. No. 09/106,396, entitled "Ink Compositions Containing Ionic Liquid Solvents," with the named inventor William M. Schwarz, filed concurrently herewith, the disclosure of which is totally incorporated herein by reference, discloses an ink composition which comprises water, a colorant, and an ionic liquid material. In a preferred embodiment, the ink is substantially free of organic solvents. Also disclosed is a process which comprises incorporating the ink composition into an ink jet printing apparatus and causing droplets of the ink composition to be ejected in an imagewise pattern onto a substrate.

Copending application U.S. Ser. No. 09/106,527, entitled "Inks for Ink Jet Printing With Reduced Intercolor Bleed," with the named inventor William M. Schwarz, filed concurrently herewith, the disclosure of which is totally incorporated herein by reference, discloses an ink composition which comprises water, an anionic dye, and a monoquaternary cationic penetrant of the formula

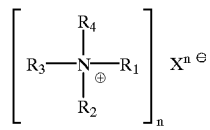

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration when applied to plain paper. Also disclosed is a set of inks for generating multicolored images which comprises (a) a first ink as described above; and (b) a second ink comprising water and a pigment; wherein intercolor bleed between the first ink and the second ink is reduced. Further disclosed are ink jet printing processes with the ink and ink set described above.

While known compositions and processes are suitable for their intended purposes, a need remains for improved ink compositions, particularly those suitable for use in ink jet printing and marking pens. In addition, a need remains for ink compositions which are substantially free of organic liquids. Further, a need remains for ink compositions which are substantially free of volatile compounds. Additionally, a need remains for ink compositions which are ecologically friendly. There is also a need for ink compositions which are nontoxic. In addition, there is a need for ink compositions which exhibit smooth jettability in ink jet printers. Further, there is a need for ink compositions which have desirable penetrating characteristics with respect to printing substrates such as paper. Additionally, there is a need for ink compositions which exhibit reduced intercolor bleed when different colored inks are printed adjacent to each other or on top of each other. A need also remains for indelible ink compositions with the above advantages. In addition, a need remains for ink compositions which generate waterfast images. Further, a need remains for ink compositions which generate smear resistant images.

SUMMARY OF THE INVENTION

It is an object of the present invention to provide ink compositions with the above noted advantages.

It is another object of the present invention to provide improved ink compositions, particularly those suitable for use in ink jet printing and marking pens.

It is yet another object of the present invention to provide ink compositions which are substantially free of organic liquids.

It is still another object of the present invention to provide ink compositions which are substantially free of volatile compounds.

Another object of the present invention is to provide ink compositions which are ecologically friendly.

Yet another object of the present invention is to provide ink compositions which are nontoxic.

Still another object of the present invention is to provide ink compositions which exhibit smooth jettability in ink jet printers.

It is another object of the present invention to provide ink compositions which have desirable penetrating characteristics with respect to printing substrates such as paper.

It is yet another object of the present invention to provide ink compositions which exhibit reduced intercolor bleed when different colored inks are printed adjacent to each other or on top of each other.

It is still another object of the present invention to provide indelible ink compositions with the above advantages.

Another object of the present invention is to provide ink compositions which generate waterfast images.

Yet another object of the present invention is to provide ink compositions which generate smear resistant images.

These and other objects of the present invention for specific embodiments thereof) can be achieved by providing an ink composition which comprises water, an acid dye, a monovalent salt, a polyquaternary amine compound, and an optional nonionic or cationic surfactant, said ink being substantially free of organic solvents.

DETAILED DESCRIPTION OF THE INVENTION

Ink compositions of the present invention comprise an aqueous liquid vehicle, an acid dye, a monovalent salt, a polyquaternary amine compound, and an optional nonionic or cationic surfactant. In conventional aqueous inks commonly used for ink jet inks, the liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In these ink compositions, the liquid vehicle is typically present in an amount of from about 80 to about 99.9 percent by weight of the ink, and preferably from about 90 to about 99 percent by weight of the ink, although the amount can be outside these ranges.

The inks of the present invention are substantially free of organic solvents, by which is meant that the ink is substantially free of all organic cosolvents, humectants, penetrants, or other materials (other than the optional surfactant) which in their pure form are liquid at about 30° C. and about 1 atmosphere of pressure. The presence of the monovalent salt in the ink eliminates the need for these materials. In the absence of organic solvents, the inks are ecologically friendly, nontoxic, and still exhibit excellent jetting characteristics. In addition, it is believed that better edge sharpness (MFLEN) can be obtained if nonpolar solvents are avoided.

Ink compositions of the present invention also include an acid dye. Any suitable acid dye or mixture of acid dyes compatible with the ink liquid vehicle can be used. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Pylam Certified D&C Red #28 (Acid Red 92), available from Pylam; Tartrazine Extra Conc. (FD&C Yellow #5, Acid Yellow 23), available from Sandoz; D&C Yellow #10 (Acid Yellow 3), available from Tricon; Pro-Jet® Magenta I (Acid Red 249); Duasyn® Acid Yellow XX-SF LP413 (Add Yellow 23); Duasyn® Rhodamine B-SF VP353 (Acid Red 52); Duasyn® Acid Blue AE-SF VP344 (Acid Blue 9); and the like, as well as mixtures thereof. The dye is present in the ink composition in any effective amount, typically from about 0.5 to about 15 percent by weight of the ink, and preferably from about 1 to about 10 percent by weight of the ink, although the amount can be outside of these ranges.

The inks of the present invention also contain a monovalent salt. The salt in its pure form is a solid at 25° C. and 1 atmosphere of pressure and has a molecular structure comprising a cation with a +1 charge ionically associated with an anion with a −1 charge. Examples of suitable cations include alkali metal cations, such as Li$^+$, Na$^+$, and K$^+$, alkaline earth metal cations, such as Mg$^{2+}$ and Ca$^{2+}$, nonpolymeric or monomeric ammonium and quaternary amine cations, including those of the general formula

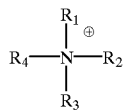

wherein each of $R_1$, $R_2$, $R_3$, and $R_4$, independently of the others, is a hydrogen atom, an alkyl group (including saturated, unsaturated, cyclic, and substituted alkyl groups, wherein substituted alkyl groups can include alkoxy or polyalkoxy groups such as ethylene oxide, polyethylene oxide, or the like), preferably with from 1 to about 10 carbon atoms and more preferably with from 1 to about 4 carbon atoms, although the number of carbon atoms can be outside of this range, aryl groups, including substituted aryl groups, preferably with from 6 to about 18 carbon atoms and more preferably with from 6 to about 12 carbon atoms, although the number of carbon atoms can be outside of this range, or arylalkyl groups, preferably with from 7 to about 20 carbon atoms and more preferably with from 7 to about 13 carbon atoms, wherein the substituents on the substituted alkyl, aryl, and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, with specific examples of ammonium and quaternary amine cations including NH$_4$$^+$, N(CH$_3$)$_4$$^+$, H$_3$NCH$_2$CH$_2$NH$_3$$^{2+}$, (CH$_3$)$_3$NCH$_2$CH$_2$N(CH$_3$)$_3$$^{2+}$, imidazolium, quaternized 1,4-diazabicyclo(2.2.2)octane, choline, of the formula

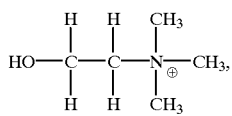

alkyl amine quaternary salts such as ETHOQUAD C/12, of the formula

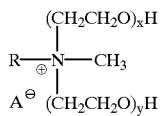

wherein R is a long chain alkyl group with 12 carbon atoms, x and y are integers of 0, 1, or 2 representing the number of ethoxy groups, wherein x+y=2, and A is an anion, such as chloride, commercially available from Akzo Chemie, Chicago, Ill., and the like, as well as mixtures thereof. Examples of suitable anions include SO$_4$$^{2-}$, CO$_3$$^{2-}$, NO$_3$$^-$, ClO$_4$$^-$, organic acid anions, such as formate, acetate, propionate, and the like, acetylacetonate, of the formula

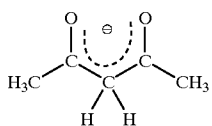

squarate, of the formula

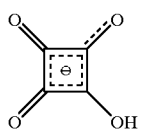

halides, including chloride, bromide, and iodide, and the like, as well as mixtures thereof. Specific examples of suitable salts include lithium chloride, lithium bromide, lithium iodide, lithium nitrate, lithium formate, lithium acetate, lithium propionate, sodium chloride, sodium bromide, sodium iodide, sodium nitrate, sodium perchlorate, sodium formate, sodium acetate, sodium propionate, potassium chloride, potassium bromide, potassium iodide, potassium formate, potassium acetate, potassium propionate, calcium chloride, calcium nitrate, calcium formate, calcium acetate, calcium propionate, magnesium chloride, magnesium sulfate, magnesium formate, magnesium acetate, magnesium propionate, ammonium chloride, ammonium bromide, ammonium iodide, ammonium acetate, ammonium formate, ammonium nitrate, ammonium sulfate, ammonium propionate, tetramethylammonium chloride, tetramethylammonium formate, tetramethylammonium acetate, tetramethylammonium propionate, ethylene diamine dihydrochloride, 1,4-diazabicyclo(2.2.2)octane salts, such as hexamethonium bromide, of the formula

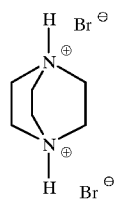

imidazole salts, such as imidazolium chloride, acetylacetonate salts, such as lithium acetylacetonate, squarate salts, such as tetramethylammonium squarate, choline salts, such as choline chloride, ETHOQUAD C/12, and the like. The salt can also be a complex salt, including transition metal complexes such as $Zn(NH_3)_4$ or the like. The salt is present in the ink in any desired or effective amount, typically from about 1 to about 15 percent by weight of the ink, and preferably from about 5 to about 15 percent by weight of the ink, although the amount can be outside of these ranges.

The polyquaternary amine compound, which generally is complexed with the anionic dye, is a polymer containing quaternary groups in the repeat units thereof. The polymer typically has a weight average molecular weight of from about 1,000 to about 10,000,000, preferably from about 3,000 to about 1,000,000, and more preferably from about 5,000 to about 400,000, although the value can be outside of these ranges. The polymer typically has a number average molecular weight of from about 800 to about 11,000,000, preferably from about 3,300 to about 1,100,000, and more preferably from about 5,600 to about 450,000, although the value can be outside of these ranges. The polymer typically has from about 5 to about 70,000 repeat monomer units therein, preferably from about 21 to about 7,000 repeat monomer units, and more preferably from about 35 to about 2,800 repeat monomer units, although the number of repeat monomer units can be outside of this range. Suitable polyquaternary amine compounds typically are of the general formulae

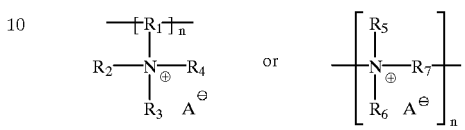

wherein n is an integer representing the number of repeat monomer units, $R_1$ is an alkylene group, including saturated, unsaturated, cyclic, and substituted alkylene groups (including polymethylene oxide groups, polyethylene oxide groups, polypropylene oxide groups, and the like), typically with from 1 to about 30 carbon atoms and preferably with from 1 to about 6 carbon atoms, an arylene group, including substituted arylene groups, typically with from 6 to about 50 carbon atoms and preferably with from 6 to about 18 carbon atoms, or an arylalkylene group, including substituted arylalkylene groups, typically with from 7 to about 60 carbon atoms and preferably with from 7 to about 20 carbon atoms, and $R_2$, $R_3$, $R_4$, $R_5$, $R_6$, and $R_7$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, alkylene, aryl, arylene, arylalkyl, and arylalkylene groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring.

Examples of suitable polyquaternary amine compounds include polydiallyl ammonium compounds, of the general formula

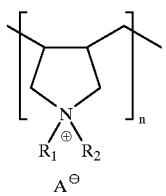

wherein n is an integer representing the number of repeat monomer units, $R_1$ and $R_2$ each, independently of the other, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, or arylalkyl groups, including substituted arylalkyl groups, typically with from about 7 to about 60 carbon atoms and preferably with from 7 to about 20 carbon atoms, wherein the substituents on the substituted alkyl aryl, and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as Cl—, Br—, I—, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, HCOO—, $CH_3COO$—, $HCO_3^-$, $CO_3^{2-}$, $H_2PO_4^-$, $HPO_{42-}$, $PO_4^{3-}$, SCN—, $BF_4^-$, $ClO_4^-$, $SSO_3^-$, or the like, such as polydiallyl dimethyl ammonium compounds, including polydiallyl dimethyl ammonium chloride, of the formula

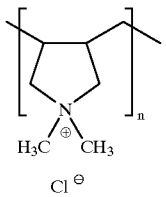

wherein n is an integer representing the number of repeat monomer units, commercially available with a molecular weight of about 400,000 (wherein n is an integer of about 2,500) from Calgon Corp. as 261-RV, and with a molecular weight of about 5,000 (wherein n is an integer of about 31) from Calgon Corp. as VARIKEM 110 or E2253.

Also suitable are polyquaternized polyvinylamines, of the general formula

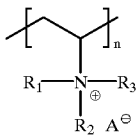

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, aryl and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as Cl—, Br—, I—, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, HCOO—, $CH_3COO$—, $HCO_3^-$, $CO_3^{2-}$, $H_2PO_4^-$, $HPO_4^{2-}$, $PO_4^{3-}$, SCN—, $BF_4^-$, $ClO_4^-$, $SSO_3^-$, or the like.

Also suitable are polyquaternized polyallylamines, of the general formula

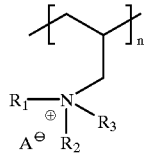

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, aryl and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as Cl—, Br—, I—, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, HCOO—, $CH_3COO$—, $HCO_3^-$, $CO_3^{2-}$, $H_2PO_4^-$, $HPO_4^{2-}$, $PO_4^{3-}$, SCN—, $BF_4^-$, $ClO_4^-$, $SSO_3^-$, or the like.

Also suitable are epichlorohydrin/amine copolymers, including those of the general formula

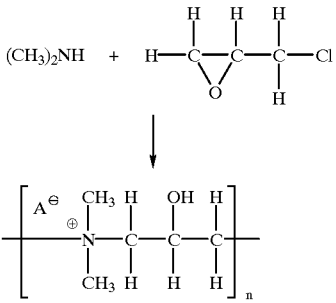

wherein n is an integer of from about 3 to about 3,000, and preferably from about 5 to about 100, although the value can be outside of these ranges, and A is any suitable or desired anion, such as Cl—, Br—, I—, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, HCOO—, $CH_3COO$—, $HCO_3^-$, $CO_3^{2-}$, $H_2PO_4^-$, $HPO_4^{2-}$, $PO_4^{3-}$, SCN—, $BF_4^-$, $ClO_4^-$, $SSO_3^-$, or the like. Polymers of this formula are commercially available from Hercules, Wilmington, Del. as RETEN 200 or RETEN 201 (molecular weight generally less than 10,000), and from Cytex, Inc., West Patterson, N.J., as CYPRO 514, 515, and 516 (wherein the polymers have a molecular weight range of from about 75,000 to about 250,000 and n is from about 870 to about 3,000), and as SUPERFLOC C567 (wherein the polymer has a molecular weight of about 10,000 and n is from about 110 to about 120, typically about 116).

Also suitable are cationic amido amine copolymers Examples of suitable cationic amido amine copolymers include those of the general formula

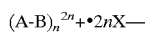

wherein X is an anion, such as Cl—, Br—, I—, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, HCOO—, $CH_3COO$—, $HCO_3^-$, $CO_3^{2-}$, $H_2PO_4^-$, $HPO_4^{2-}$, $PO_4^{3-}$, SCN—, $BF_4^-$, $ClO_4^-$, $SSO_3^-$, or the like, n is an integer representing the number of repeating monomer units, and typically is from about 2 to about 1,000, preferably from about 3 to about 200, more preferably from about 3 to about 100, and even more preferably from about 3 to about 10, although the value can be outside of these ranges, "A" is

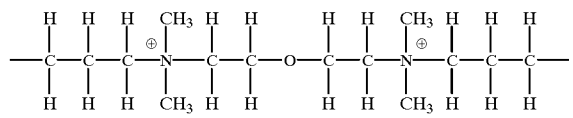

and "B" is selected from the group consisting of (a) monomers of the formula

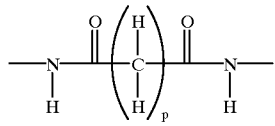

wherein p is an integer representing the number of repeat monomer units, and typically is from 1 to about 12, preferably from 1 to about 7, and more preferably from 1 to about 4, although the value can be outside of these ranges, such as (i) azeleic acid diamido, wherein p is 7, of the formula

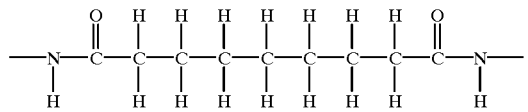

or (ii) adipic acid diamido, wherein p is 4, of the formula

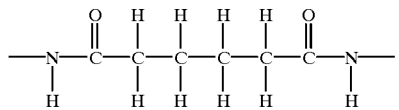

and (b) ureido, of the formula

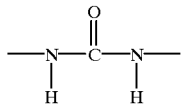

Mixtures of two or more "B" monomers can also be used within the polymer. In a preferred embodiment, these specific polymers typically are condensation polymers, with alternating "A" and "B" monomer units. The weight average molecular weight of the polymer typically is from about 1,000 to about 100,000, preferably from about 1,000 to about 30,000, and more preferably from about 2,000 to about 5,000, although the value can be outside of these ranges. Copolymers of an amine and an amide are commercially available from, for example, Rhone-Poulenc, Cranbury, N.J., as, for example, MIRAPOL AZ-1, of the above formula wherein the "B" monomer is azeleic acid diamido, n has an average value of about 100, and the molecular weight is about 50,000, MIRAPOL AD-1, of the above formula wherein the "B" monomer is adipic acid diamido, n has an average value of about 100, and the molecular weight is about 50,000, and MIRAPOL A-15, of the above formula wherein the "B" monomer is ureido, n has an average value of about 6, and the molecular weight is about 2,260.

Also suitable are copolymers of vinyl pyrrolidinone and a vinyl imidazolium salt. In one embodiment, the copolymer is of a vinyl imidazolium salt of the formula

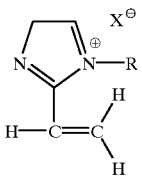

wherein X is an anion and R is a hydrogen atom or an alkyl group, typically with from 1 to about 8 carbon atoms and preferably with from 1 to about 3 carbon atoms, and vinyl pyrrolidinone, of the formula

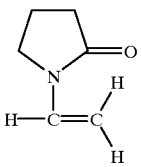

wherein the copolymer is of the general formula

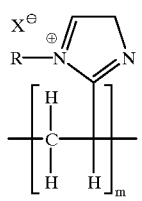

wherein X is any suitable or desired anion, such as Cl—, Br—, I—, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, HCOO—, $CH_3COO$—, $HCO_3^-$, $CO_3^{2-}$, $H_2PO_4^-$, $HPO_4^{2-}$, $PO_4^{3-}$, SCN—, $BF_4^-$, $ClO_4^-$, $SSO_3^-$, or the like, R is a hydrogen atom or an alkyl group, typically with from 1 to about 8 carbon atoms, and preferably with from 1 to about 3 carbon atoms, m is an integer representing the number of repeat vinyl imidazolium units, and n is an integer representing the number of repeat vinyl pyrrolidinone units. When R is a hydrogen atom, the pH of the ink can be adjusted to provide optimal ink-paper interaction; for example, the hydrogen atom can be extracted upon contact with the paper, or the cationic character of the polymer can be adjusted with ink pH. Random copolymers of the above formula generally are preferred, although alternating and block copolymers are also suitable. The weight average molecular weight of the polymer typically is from about 1,000 to about 1,000,000, preferably from about 1,000 to about 100,000, and more preferably from about 2,000 to about 5,000, although the value can be outside of these ranges. The ratio of vinyl imidazolium monomers to vinyl pyrrolidinone monomers typically is from about 99:1 to about 5:95, preferably from about 95:5 to about 20:80, more preferably from about 95:5 to about 30:70, and even more preferably from about 95:5 to about 50:50, although the value can be outside of these ranges. Vinyl pyrrolidinone/vinyl imidazolium salt copolymers are commercially available; for example, BASF, Parsippany, N.J., provides vinyl imidazolium chloride/vinyl pyrrolidinone copolymers (of the above formula wherein R is $CH_3$) with a molecular weight of about 100,000 in three monomer ratios: LUVIQUAT® FC905 has a vinyl imidazolium chloride:vinyl pyrrolidinone ratio of 95:5 with 6.7 milliequivalents per gram of cationic groups, LUVIQUAT® FC550 has a vinyl imidazolium chloride:vinyl pyrrolidinone ratio of 50:50 with 3.0 milliequivalents per gram of cationic groups, and LUVIQUAT® FC370 has a vinyl imidazolium chloride:vinyl pyrrolidinone ratio of 30:70 with 1.8 milliequivalents per gram of cationic groups. Also available from BASF is LUVIQUAT® HM552, with a molecular weight of about 800,000 and a vinyl imidazolium chloride:vinyl pyrrolidinone ratio of 50:50.

Mixtures of two or more polyquaternary amine compounds can also be present in the ink.

The polyquaternary amine compound is present in the ink in any desired or effective amount, typically from about 0.01 to about 50 percent by weight of the ink, more typically from about 0.05 to about 40 percent by weight of the ink, preferably from about 1 to about 10 percent by weight of the ink, more preferably from about 1 to about 9 percent by weight of the ink, and even more preferably from about 1 to about 5 percent by weight of the ink, although the amount can be outside of these ranges. The preferred relative amounts of polyquaternary amine and anionic dye in the ink can also be expressed as a stoichiometric ratio, with the molar ratio of anionic dye groups to cationic polyquaternary groups typically being from about 1:0.33 to about 1:300, preferably from about 1:1 to about 1:20, more preferably from about 1:2 to about 1:6, and most preferably about 1:3, although the relative amounts can be outside of these ranges.

In a preferred embodiment, the inks of the present invention also contain a surfactant. While not being limited to any particular theory, it is believed that the presence of the surfactant enhances penetration of printing substrates such as paper and controls intercolor bleed. Nonionic surfactants, such as octylphenoxy polyethoxy ethanols, including TRITON® X-100, available from Union Carbide Co., Danbury, Conn., non-ionic esters of ethylene oxide and propylene oxide, such as MERPOL LF-H (believed to be of the formula $CH_3(CH_2)_n(OC_2H_4)_8(OC_3H_6)_8OH$ where n is an integer from about 12 to about 16), available from E. I. Du Pont de Nemours & Co., Wilmington, Del., acetylenic diols such as 2,4,7,9-tetramethyl-5-decyn-4,7-diol and the like, such as SURFYNOL CT-136, available from Air Products & Chemicals Co., Allentown, Pa., trimethyl nonylpolyethyleneglycol ethers, such as TERGITOL TMN-10 (containing 10 oxyethylene units, believed to be of the formula $C_{12}H_{25}O(C_2H_4O)_5H$), available from Union Carbide Co., Danbury, Conn., and the like, and cationic surfactants, such as cetyl trimethyl ammonium bromide, are particularly preferred. The surfactant is present in the ink in any desired or effective amount, typically from about 0.1 to about 5 percent by weight of the ink, and preferably from about 0.1 to about 3 percent by weight of the ink, although the amount can be outside of these ranges.

In another embodiment, the ink further optionally contains a viscosity building component. Any desired or suitable viscosity building component can be employed, such as hydrophilic polysaccharides and their modifications, including (1) starch (such as starch SLS-280, available from St. Lawrence Starch, or corn starch), (2) hydroxyalkylstarch, wherein alkyl has at least one carbon atom and wherein the number of carbon atoms is such that the material is water soluble, preferably from about 1 to about 20 carbon atoms, and more preferably from about 1 to about 10 carbon atoms, such as methyl, ethyl, propyl, butyl, or the like (such as hydroxypropyl starch (#02382, available from Poly Sciences Inc.) and hydroxyethyl starch (#06733, available from Poly Sciences Inc.)), (3) gelatin (such as Calfskin gelatin #00639, available from Poly Sciences Inc.), (4) alkyl celluloses and aryl celluloses, wherein alkyl has at least one carbon atom and wherein the number of carbon atoms is such that the material is water soluble, preferably from 1 to about 20 carbon atoms, more preferably from 1 to about 10 carbon atoms, and even more preferably from 1 to about 7 carbon atoms, such as methyl, ethyl, propyl, butyl, pentyl, hexyl, benzyl, and the like (such as methyl cellulose (Methocel AM 4, available from Dow Chemical Company)), and wherein aryl has at least 6 carbon atoms and wherein the number of carbon atoms is such that the material is water soluble, preferably from 6 to about 20 carbon atoms, more preferably from 6 to about 10 carbon atoms, and even more preferably about 6 carbon atoms, such as phenyl, (5) hydroxy alkyl celluloses, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as hydroxyethyl cellulose (Natrosol 250 LR, available from Hercules Chemical Company), and hydroxypropyl cellulose (Klucel Type E, available from Hercules Chemical Company)), (6) alkyl hydroxy alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as ethyl hydroxyethyl cellulose (Bermocoll, available from Berol Kem. A.B. Sweden)), (7) hydroxy alkyl alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxyethyl methyl cellulose (HEM, available from British Celanese Ltd., also available as Tylose MH, MHK from Kalle A.G.), hydroxypropyl methyl cellulose (Methocel K35LV, available from Dow Chemical Company), and hydroxy butylmethyl cellulose (such as HBMC, available from Dow Chemical Company)), (8) dihydroxyalkyl celluloses, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dihydroxypropyl cellulose, which can be prepared by the reaction of 3-chloro-1,2-propane with alkali cellulose), (9) hydroxy alkyl hydroxy alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxypropyl hydroxyethyl cellulose, available from Aqualon Company), (10) halodeoxycelluloses, wherein halo represents a halogen atom (such as chlorodeoxycellulose, which can be prepared by the reaction of cellulose with sulfuryl chloride in pyridine at 25° C.), (11) amino deoxycellulose (which can be prepared by the reaction of chlorodeoxy cellulose with 19 percent alcoholic solution of ammonia for 6 hours at 160° C.), (12) dialkyl amino alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, (such as diethyl amino ethyl cellulose, available from Poly Sciences Inc. as DEAE cellulose #05178), (13) carboxyalkyl celluloses, such as carboxymethyl cellulose, (14) carboxyalkyl dextrans, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, and the like, (such as carboxymethyl dextrans, available from Poly Sciences Inc. as #16058), (15) dialkyl aminoalkyl dextrans, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as diethyl aminoethyl dextran, available from Poly Sciences Inc. as #5178), (16) amino dextran (available from Molecular Probes Inc.), (17) gum arabic (such as #G9752, available from Sigma Chemical Company), (18) carrageenan (such as #C1013 available from Sigma Chemical Company), (19) Karaya gum (such as #G0503, available from Sigma Chemical Company), (20) xanthan gum (such as Keltrol-T, available from Kelco division of Merck and Company), (21) chitosan (such as #C3646, available from Sigma Chemical Company), (22) carboxyalkyl hydroxyalkyl guars, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as carboxymethyl hydroxypropyl guar, available from Aqualon Company), (23) n-carboxyalkyl chitins, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, such as n-carboxymethyl chitin, (24) agar-agar (such as that available from Pfaltz and Bauer Inc.), and the like, as well as mixtures thereof, with materials such as xanthan gum, gum arabic, alginates such as carrageenan and agar, starch, and carboxymethyl cellulose being preferred. The viscosity building component is particularly preferred in marking pen applications. Inks containing a gum viscosity building component exhibit improved edge acuity, reduced showthrough on paper, and higher optical density compared to inks not having this component. The viscosity building component is present in the ink in any desired or effective amount, typically from about 0.1 to about 5 percent by weight of the ink, and preferably from about 0.1 to about 3 percent by weight of the ink, although the amount can be outside of these ranges.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

When used in ink jet printing applications, the ink compositions are generally of a viscosity suitable for use in said ink jet printing processes. For example, for thermal ink jet printing applications, at room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range, particularly when the ink is used for applications such as acoustic ink jet printing. When used in marking pen applications, the ink compositions are generally of a viscosity suitable for use in said applications.

Ink compositions of the present invention can be of any suitable or desired pH. For some embodiments, such as thermal ink jet printing processes, typical pH values are from about 3 to about 11, preferably from about 5 to about 10, and more preferably from about 6 to about 9, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. In another embodiment of the present invention, the printing apparatus employs an acoustic ink jet process wherein droplets of the ink are caused to be ejected in imagewise pattern by acoustic beams. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

The inks of the present invention are suitable for applications wherein indelible marks are desired. The indelible marks made by inks of the present invention can be removed with a composition which comprises water and a dianionic surfactant. While not being limited to any particular theory, it is believed that the indelible quality of the inks of the present invention results when the anionic dye, which is ionically bonded to the polyquaternary cationic conductive polymer, bonds tightly to anionic groups such as carboxylates on substrates such as paper or cloth. Anionic dyes alone are water washable. By applying to the image a solution containing water and a dianionic surfactant, particularly wherein the anionic substituents are geometrically positioned so that they can bond ionically in a bidentate fashion more tightly than the anionic dyes to the polyquaternary polymers, the anionic dyes are again rendered washable. The dianionic surfactants are safe, and can be used on skin or in washing machines to remove the images from skin or cloth. Examples of suitable dianionic surfactants include linear alkyl diphenyl oxide disulfonates, believed to be of the general formula

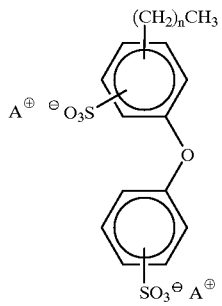

wherein n is an integer, typically of from 1 to about 15 and preferably from 1 to about 10, and A is any desired cation, including (but not limited to) alkali metals and the like, such as sodium n-decyl diphenyl oxide disulfonate (CALFAX 10L-45), sodium dodecyl diphenyl oxide disulfonate (CALFAX DB-45), and sodium hexadecyl diphenyl oxide disulfonate (CALFAX 16L-35), commercially available from Pilot Chemical Co., and the like, as well as mixtures thereof. The dianionic surfactant is present in water in any desired or effective amount, typically from about 0.1 to about 10 percent by weight of the washing solution, preferably from about 1 to about 5 percent by weight of the washing solution, and more preferably from about 1 to about 3 percent by weight of the washing solution, although the amount can be outside of these ranges.

In one preferred embodiment, the washing solution further contains a salt and/or urea. Examples of suitable salts include those disclosed hereinabove as being suitable components for the ink compositions of the present invention. The salt is present in the washing solution in any desired or effective amount, typically from about 1 to about 25 percent by weight of the washing solution, preferably from about 1 to about 15 percent by weight of the washing solution, and more preferably from about 1 to about 10 percent by weight of the washing solution, although the amount can be outside of these ranges. The urea is present in the washing solution in any desired or effective amount, typically from about 1 to about 30 percent by weight of the washing solution, preferably from about 1 to about 20 percent by weight of the washing solution, and more preferably from about 1 to about 5 percent by weight of the washing solution, although the amount can be outside of these ranges. While not being limited to any particular theory, it is believed that the salt increases exchange of the anionic dye molecules ionically associated with the polymer with other anions, such as halides, thereby loosening the dyes from the polymer, and that the urea solubilizes the free anionic dyes for easy wash-off.

Optionally, the washing solution further contains a viscosity building component. Examples of suitable viscosity building components include those disclosed hereinabove as being suitable components for the ink compositions of the present invention. By adding the viscosity building component to the wash off solution, an easily dispensed gel is obtained which does not run when placed on marked skin or clothing. When present, the viscosity building component is present in the washing solution in any desired or effective amount, typically from about 0.1 to about 5 percent by weight of the washing solution, preferably from about 0.1 to about 3 percent by weight of the washing solution, and more preferably from about 1 to about 3 percent by weight of the washing solution, although the amount can be outside of these ranges.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared by simple mixing of Acid Blue 9 dye (3 parts by weight dye solids), Acid Yellow 23 dye (3 parts by weight dye solids), Acid Red 52 dye (3 parts by weight dye solids), sodium chloride (5 parts by weight), TRITON® X-100 surfactant (1 part by weight), VARIKEM 110 polymer (25 parts by weight of an aqueous solution containing 40 percent by weight polydiallyl dimethyl ammonium chloride polymer, molecular weight about 5,000, and 60 percent by weight water, obtained from Calgon Corp.), and deionized water (60 parts by weight). The ink thus prepared was incorporated into a XEROX® DOCUPRINT® XJ4C thermal ink jet printer and prints were generated on plain paper. The ink exhibited good jetting characteristics, good paper penetrability, and indelible characteristics.

EXAMPLE II

An ink composition was prepared by simple mixing of Acid Blue 9 dye (2.5 parts by weight dye solids), sodium chloride (5 parts by weight), TRITON® X-100 surfactant (1 part by weight), VARIKEM 110 polymer (25 parts by weight of an aqueous solution containing 40 percent by weight polydiallyl dimethyl ammonium chloride polymer, molecular weight about 5,000, and 60 percent by weight water, obtained from Calgon Corp.), and deionized water (66.5 parts by weight). The ink thus prepared was used to fill a felt tipped marking pen, and marks were then made with the pen on plain paper. The images thus generated exhibited good penetration of the paper, sharp lines, no feathering, smear

21 resistance, and waterproof characteristics (as tested by running water from a faucet over the imaged paper).

EXAMPLE III

An ink composition was prepared as described in Example II except that the ink also contained 1 percent by weight of food grade xanthan gum (Keltrol T, obtained from Kelco division of Merck & Co.). The ink was stirred, and, to hasten the homogenization process, the ink was heated to near the boiling temperature of the ink during stirring. The resulting ink had the consistency of a stiff gel.

EXAMPLE IV

Ink compositions prepared as described in Examples I and II were printed onto cotton fabric. To the images thus formed was then applied a washing solution comprising 100 percent by weight of CALFAX 10L-45 dianionic surfactant as received from the manufacturer (obtained from Pilot Chemical Co.; commercial product contained 35 percent by weight surfactant in water), followed by rinsing with water. The ink images thus treated were substantially removed from the fabric, with over 80 percent of the ink marks being washed away.

EXAMPLE V

Ink compositions prepared as described in Examples I and II were printed onto cotton fabric. To the images thus formed was then applied a washing solution comprising 5 percent by weight of CALFAX 10L-45 dianionic surfactant solids (obtained from Pilot Chemical Co.; commercial product contained 35 percent by weight surfactant), 70 percent by weight water (some of which was from the commercial surfactant solution), 10 percent by weight sodium chloride, and 15 percent by weight urea, followed by rinsing with water. The ink images thus treated were substantially removed from the fabric, with over 95 percent of the ink marks being washed away.

EXAMPLE VI

A washing solution was prepared as described in Example V except that the washing solution also contained 1 percent by weight of food grade xanthan gum (Keltrol T, obtained from Kelco division of Merck & Co.). The washing solution was stirred, and, to hasten the homogenization process, the washing solution was heated to near the boiling temperature of the washing solution during stirring. The resulting washing solution had the consistency of a stiff gel. The washing solution was then used to wash away ink from cotton fabric as described in Example V, with the added advantage that the washing solution was easily applied to only those portions of the fabric stained with ink and not to other portions of the fabric. Results similar to those of Example V were obtained.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises (a) water, (b) an acid dye, (c) a monovalent salt, (d) a polyquaternary amine compound selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt containing at least about 50 percent vinyl imidazolium salt monomers, and mixtures thereof, and (e) an optional nonionic or cationic surfactant, said ink being substantially free of organic solvents.

2. An ink composition according to claim 1 wherein the dye is present in the ink in an amount of from about 0.5 to about 15 percent by weight of the ink.

3. An ink composition according to claim 1 wherein the dye is selected from the group consisting of Acid Blue 9, Acid Yellow 23, Acid Red 52, and mixtures thereof.

4. An ink composition according to claim 1 wherein the monovalent salt is present in the ink in an amount of from about 1 to about 15 percent by weight of the ink.

5. An ink composition according to claim 1 wherein the salt contains anions selected from the group consisting of chloride, bromide, iodide, carboxylate, sulfate, acetate, propionate, hexane sulfonate, carbonate, formate, nitrate, perchlorate, acetylacetonate, squarate, and mixtures thereof, and contains cations selected from the group consisting of alkali metal ions, alkaline earth ions quaternary amine ions, ammonium ions, $N(CH_3)_4^+$, $H_3NCH_2CH_2NH_3^{2+}$, $(H_3C)_3NCH_2CH_2N(CH_3)_3^{2+}$, quaternized 1,4-diazabicyclo(2.2.2)octane, imidazolium, choline,

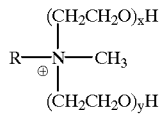

wherein R is a long chain alkyl group with 12 carbon atoms, x and y are integers of 0, 1, or 2 representing the number of ethoxy groups, wherein x+y=2, and mixtures thereof.

6. An ink composition according to claim 1 wherein the polyquaternary amine is present in the ink in an amount of from about 0.01 to about 50 percent by weight of the ink.

7. An ink composition according to claim 1 wherein the polyquaternary amine is present in the ink in an amount of from about 1 to about 10 percent by weight of the ink.

8. An ink composition according to claim 1 wherein the polyquaternary amine is selected from the group consisting of polydiallyl ammonium compounds, polyquaternized polyvinylamines, and mixtures thereof.

9. An ink composition according to claim 1 containing a surfactant selected from the group consisting of octylphenoxy polyethoxy ethanols, non-ionic esters of ethylene oxide and propylene oxide, acetylenic diols, trimethyl nonylpolyethylene-glycol ethers, cetyl trimethyl ammonium bromide, and mixtures thereof.

10. An ink composition according to claim 9 wherein the surfactant is present in the ink in an amount of from about 0.1 to about 5 percent by weight of the ink.

11. An ink composition according to claim 1 further containing a viscosity building component.

12. An ink composition according to claim 11 wherein the viscosity building component is present in the ink in an amount of from about 0.1 to about 5 percent by weight of the ink.

13. An ink composition according to claim 11 wherein the viscosity building component is selected from the group consisting of (1) starch, (2) hydroxyalkylstarch, (3) gelatin, (4) alkyl celluloses and aryl celluloses, (5) hydroxy alkyl celluloses, (6) alkyl hydroxy alkyl celluloses, (7) hydroxy alkyl alkyl celluloses, (8) dihydroxyalkyl celluloses, (9) hydroxy alkyl hydroxy alkyl celluloses, (10) halodeoxycelluloses, (11) amino deoxycellulose, (12) dialkyl amino alkyl celluloses, (13) carboxyalkyl celluloses,

(14) carboxyalkyl dextrans, (15) dialkyl aminoalkyl dextrans, (16) amino dextran, (17) gum arabic, (18) carrageenan, (19) Karaya gum, (20) xanthan gum, (21) chitosan, (22) carboxyalkyl hydroxyalkyl guars, (23) n-carboxyalkyl chitins, (24) agar—agar, and (25) mixtures thereof.

14. A process which comprises applying an ink composition according to claim 1 to a substrate in an imagewise pattern.

15. A process according to claim 14 wherein the ink is applied to the substrate by incorporating the ink composition into an ink jet printing apparatus and causing droplets of the ink composition to be ejected in an imagewise pattern onto the substrate.

16. A process according to claim 15 wherein the printing apparatus employs a thermal ink jet process wherein the ink in the nozzles is selectively heated in an imagewise pattern, thereby causing droplets of the ink to be ejected in imagewise pattern.

17. A process according to claim 15 wherein the printing apparatus employs an acoustic ink jet process wherein droplets of the ink are caused to be ejected in imagewise pattern by acoustic beams.

18. A process according to claim 14 wherein the ink is applied to the substrate by incorporating the ink composition into a marking pen and causing marks to be made on the substrate in an imagewise pattern with the marking pen.

19. A process according to claim 14 wherein, subsequent to formation of ink images to the substrate, the substrate is washed with a washing composition comprising water and a dianionic surfactant.

20. A process according to claim 19 wherein the dianionic surfactant is a linear alkyl diphenyl oxide disulfonate.

21. A process according to claim 19 wherein the dianionic surfactant is selected from the group consisting of sodium n-decyl diphenyl oxide disulfonate, sodium dodecyl diphenyl oxide disulfonate, sodium hexadecyl diphenyl oxide disulfonate, and mixtures thereof.

22. A process according to claim 19 wherein the dianionic surfactant is present in the washing composition in an amount of from about 0.1 to about 10 percent by weight of the washing composition.

23. A process according to claim 19 wherein the washing composition further comprises a monovalent salt.

24. A process according to claim 23 wherein the monovalent salt is present in the washing composition in an amount of from about 1 to about 25 percent by weight of the washing composition.

25. A process according to claim 19 wherein the washing composition further comprises urea.

26. A process according to claim 25 wherein the urea is present in the washing composition in an amount of from about 1 to about 30 percent by weight of the washing composition.

27. A process according to claim 19 wherein the washing composition further comprises a viscosity building component.

28. A process according to claim 27 wherein the viscosity building component is present in the washing composition in an amount of from about 0.1 to about 5 percent by weight of the washing composition.

29. A process according to claim 19 wherein the dianionic surfactant has alkali metal counterions.

30. An ink composition according to claim 1 wherein the salt has a cation selected from the group consisting of alkali metal ions, alkaline earth ions, quaternary amine ions, ammonium ions, $N(CH_3)_4^+$, $H_3NCH_2CH_2NH_3^{2+}$, $(H_3C)_3NCH_2CH_2N(CH_3)_3^{2+}$, quaternized 1,4-diazabicyclo(2.2.2)octane, imidazolium, choline,

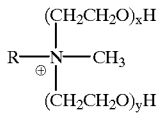

wherein R is a long chain alkyl group with 12 carbon atoms, x and y are integers of 0, 1, or 2 representing the number of ethoxy groups, wherein x+y=2, and mixtures thereof.

31. An ink composition according to claim 1 wherein the salt contains anions selected from the group consisting of chloride, bromide, iodide, carboxylate, sulfate, acetate, propionate, hexane sulfonate, carbonate, formate, nitrate, perchlorate, acetylacetonate, squarate, and mixtures thereof.

32. An ink composition according to claim 1 wherein the salt is lithium chloride, lithium bromide, lithium iodide, lithium nitrate, lithium formate, lithium acetate, lithium propionate, sodium chloride, sodium bromide, sodium iodide, sodium nitrate, sodium perchlorate, sodium formate, sodium acetate, sodium propionate, potassium chloride, potassium bromide, potassium iodide, potassium formate, potassium acetate, potassium propionate, calcium chloride, calcium nitrate, calcium formate, calcium acetate, calcium propionate, magnesium chloride, magnesium sulfate, magnesium formate, magnesium acetate, magnesium propionate, ammonium chloride, ammonium bromide, ammonium iodide, ammonium acetate, ammonium formate, ammonium nitrate, ammonium sulfate, ammonium propionate, tetramethylammonium chloride, tetramethylammonium formate, tetramethylammonium acetate, tetramethylammonium propionate, ethylene diamine dihydrochloride, hexamethonium bromide, imidazolium chloride, lithium acetylacetonate, tetramethylammonium squarate, choline chloride, or mixtures thereof.

33. An ink composition which comprises (a) water, (b) an acid dye, (c) a monovalent salt having a cation selected from the group consisting of alkali metal ions, alkaline earth ions, ammonium ions, $N(CH_3)_4^+$, $H_3NCH_2CH_2NH_3^{2+}$, $(H_3C)_3NCH_2CH_2N(CH_3)_3^{2+}$, quaternized 1,4-diazabicyclo(2.2.2)octane, choline,

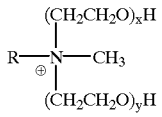

wherein R is a long chain alkyl group with 12 carbon atoms, x and y are integers of 0, 1, or 2 representing the number of ethoxy groups, wherein x+y=2, and mixtures thereof, (d) a polyquaternary amine compound, and (e) an optional nonionic or cationic surfactant, said ink being substantially free of organic solvents.

34. An ink composition according to claim 33 wherein the dye is present in the ink in an amount of from about 0.5 to about 15 percent by weight of the ink.

35. An ink composition according to claim 33 wherein the dye is selected from the group consisting of Acid Blue 9, Acid Yellow 23, Acid Red 52, and mixtures thereof.

36. An ink composition according to claim 33 wherein the monovalent salt is present in the ink in an amount of from about 1 to about 15 percent by weight of the ink.

37. An ink composition according to claim 33 wherein the polyquaternary amine is present in the ink in an amount of from about 0.01 to about 50 percent by weight of the ink.

38. An ink composition according to claim 33 wherein the polyquaternary amine is present in the ink in an amount of from about 1 to about 10 percent by weight of the ink.

39. An ink composition according to claim 33 wherein the polyquaternary amine is selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt and mixtures thereof.

40. An ink composition according to claim 33 containing a surfactant selected from the group consisting of octylphenoxy polyethoxy ethanols, non-ionic esters of ethylene oxide and propylene oxide, acetylenic diols, trimethyl nonylpolyethylene-glycol ethers, cetyl trimethyl ammonium bromide, and mixtures thereof.

41. An ink composition according to claim 40 wherein the surfactant is present in the ink in an amount of from about 0.1 to about 5 percent by weight of the ink.

42. An ink composition according to claim 33 further containing a viscosity building component.

43. An ink composition according to claim 42 wherein the viscosity building component is present in the ink in an amount of from about 0.1 to about 5 percent by weight of the ink.

44. An ink composition according to claim 42 wherein the viscosity building component is selected from the group consisting of (1) starch, (2) hydroxyalkylstarch, (3) gelatin, (4) alkyl celluloses and aryl celluloses, (5) hydroxy alkyl celluloses, (6) alkyl hydroxy alkyl celluloses, (7) hydroxy alkyl alkyl celluloses, (8) dihydroxyalkyl celluloses, (9) hydroxy alkyl hydroxy alkyl celluloses, (10) halodeoxycelluloses, (11) amino deoxycellulose, (12) dialkyl amino alkyl celluloses, (13) carboxyalkyl celluloses, (14) carboxyalkyl dextrans, (15) dialkyl aminoalkyl dextrans, (16) amino dextran, (17) gum arabic, (18) carrageenan, (19) Karaya gum, (20) xanthan gum, (21) chitosan, (22) carboxyalkyl hydroxyalkyl guars, (23) n-carboxyalkyl chitins, (24) agar—agar, and (25) mixtures thereof.

45. A process which comprises applying an ink composition according to claim to a substrate in an imagewise pattern.

46. A process according to claim 45 wherein the ink is applied to the substrate by incorporating the ink composition into an ink jet printing apparatus and causing droplets of the ink composition to be ejected in an imagewise pattern onto the substrate.

47. A process according to claim 46 wherein the printing apparatus employs a thermal ink jet process wherein the ink in the nozzles is selectively heated in an imagewise pattern, thereby causing droplets of the ink to be ejected in imagewise pattern.

48. A process according to claim 46 wherein the printing apparatus employs an acoustic ink jet process wherein droplets of the ink are caused to be ejected in imagewise pattern by acoustic beams.

49. A process according to claim 45 wherein the ink is applied to the substrate by incorporating the ink composition into a marking pen and causing marks to be made on the substrate in an imagewise pattern with the marking pen.

50. A process according to claim 45 wherein, subsequent to formation of ink images to the substrate, the substrate is washed with a washing composition comprising water and a dianionic surfactant.

51. A process according to claim 50 wherein the dianionic surfactant is a linear alkyl diphenyl oxide disulfonate.

52. A process according to claim 50 wherein the dianionic surfactant is selected from the group consisting of sodium n-decyl diphenyl oxide disulfonate, sodium dodecyl diphenyl oxide disulfonate, sodium hexadecyl diphenyl oxide disulfonate, and mixtures thereof.

53. A process according to claim 50 wherein the dianionic surfactant is present in the washing composition in an amount of from about 0.1 to about 10 percent by weight of the washing composition.

54. A process according to claim 50 wherein the washing composition further comprises a monovalent salt.

55. A process according to claim 54 wherein the monovalent salt is present in the washing composition in an amount of from about 1 to about 25 percent by weight of the washing composition.

56. A process according to claim 50 wherein the washing composition further comprises urea.

57. A process according to claim 56 wherein the urea is present in the washing composition in an amount of from about 1 to about 30 percent by weight of the washing composition.

58. A process according to claim 50 wherein the washing composition further comprises a viscosity building component.

59. A process according to claim 58 wherein the viscosity building component is present in the washing composition in an amount of from about 0.1 to about 5 percent by weight of the washing composition.

60. A process according to claim 50 wherein the dianionic surfactant has alkali metal counterions.

61. An ink composition according to claim 33 wherein the salt contains anions selected from the group consisting of chloride, bromide, iodide, carboxylate, sulfate, acetate, propionate, hexane sulfonate, carbonate, formate, nitrate, perchlorate, acetylacetonate, squarate, and mixtures thereof.

62. An ink composition which comprises water, an acid dye, a monovalent salt containing anions selected from the group consisting of chloride, bromide, iodide, sulfate, acetate, propionate, hexane sulfonate, carbonate, nitrate, perchlorate, acetylacetonate, squarate, and mixtures thereof, a polyquaternary amine compound, and an optional nonionic or cationic surfactant, said ink being substantially free of organic solvents.

63. An ink composition according to claim 62 wherein the dye is present in the ink in an amount of from about 0.5 to about 15 percent by weight of the ink.

64. An ink composition according to claim 62 wherein the dye is selected from the group consisting of Acid Blue 9, Acid Yellow 23, Acid Red 52, and mixtures thereof.

65. An ink composition according to claim 62 wherein the monovalent salt is present in the ink in an amount of from about 1 to about 15 percent by weight of the ink.

66. An ink composition according to claim 62 wherein the polyquaternary amine is present in the ink in an amount of from about 0.01 to about 50 percent by weight of the ink.

67. An ink composition according to claim 62 wherein the polyquaternary amine is present in the ink in an amount of from about 1 to about 10 percent by weight of the ink.

68. An ink composition according to claim 62 wherein the polyquaternary amine is selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

69. An ink composition according to claim 62 containing a surfactant selected from the group consisting of octylphenoxy polyethoxy ethanols, non-ionic esters of ethylene oxide and propylene oxide, acetylenic diols, trimethyl nonylpolyethylene-glycol ethers, cetyl trimethyl ammonium bromide, and mixtures thereof.

70. An ink composition according to claim 69 wherein the surfactant is present in the ink in an amount of from about 0.1 to about 5 percent by weight of the ink.

71. An ink composition according to claim 62 further containing a viscosity building component.

72. An ink composition according to claim 71 wherein the viscosity building component is present in the ink in an amount of from about 0.1 to about 5 percent by weight of the ink.

73. An ink composition according to claim 71 wherein the viscosity building component is selected from the group consisting of (1) starch, (2) hydroxyalkylstarch, (3) gelatin, (4) alkyl celluloses and aryl celluloses, (5) hydroxy alkyl celluloses, (6) alkyl hydroxy alkyl celluloses, (7) hydroxy alkyl alkyl celluloses, (8) dihydroxyalkyl celluloses, (9) hydroxy alkyl hydroxy alkyl alkyl celluloses, (10) halodeoxycelluloses, ( 11) amino deoxycellulose, (12) dialkyl amino alkyl celluloses, (13) carboxyalkyl celluloses, (14) carboxyalkyl dextrans, (15) dialkyl aminoalkyl dextrans, (16) amino dextran, (17) gum arabic, (18) carrageenan, (19) Karaya gum, (20) xanthan gum, (21) chitosan, (22) carboxyalkyl hydroxyalkyl guars, (23) n-carboxyalkyl chitins, (24) agar-agar, and (25) mixtures thereof.

74. A process which comprises applying an ink composition according to claim 62 to a substrate in an imagewise pattern.

75. A process according to claim 74 wherein the ink is applied to the substrate by incorporating the ink composition into an ink jet printing apparatus and causing droplets of the ink composition to be ejected in an imagewise pattern onto the substrate.

76. A process according to claim 75 wherein the printing apparatus employs a thermal ink jet process wherein the ink in the nozzles is selectively heated in an imagewise pattern, thereby causing droplets of the ink to be ejected in imagewise pattern.

77. A process according to claim 75 wherein the printing apparatus employs an acoustic ink jet process wherein droplets of the ink are caused to be ejected in imagewise pattern by acoustic beams.

78. A process according to claim 74 wherein the ink is applied to the substrate by incorporating the ink composition into a marking pen and causing marks to be made on the substrate in an imagewise pattern with the marking pen.

79. A process according to claim 74 wherein, subsequent to formation of ink images to the substrate, the substrate is washed with a washing composition comprising water and a dianionic surfactant.

80. A process according to claim 79 wherein the dianionic surfactant is a linear alkyl diphenyl oxide disulfonate.

81. A process according to claim 79 wherein the dianionic surfactant is selected from the group consisting of sodium n-decyl diphenyl oxide disulfonate, sodium dodecyl diphenyl oxide disulfonate, sodium hexadecyl diphenyl oxide disulfonate, and mixtures thereof.

82. A process according to claim 79 wherein the dianionic surfactant is present in the washing composition in an amount of from about 0.1 to about 10 percent by weight of the washing composition.

83. A process according to claim 79 wherein the washing composition further comprises a monovalent salt.

84. A process according to claim 83 wherein the monovalent salt is present in the washing composition in an amount of from about 1 to about 25 percent by weight of the washing composition.

85. A process according to claim 79 wherein the washing composition further comprises urea.

86. A process according to claim 85 wherein the urea is present in the washing composition in an amount of from about 1 to about 30 percent by weight of the washing composition.

87. A process according to claim 79 wherein the washing composition further comprises a viscosity building component.

88. A process according to claim 87 wherein the viscosity building component is present in the washing composition in an amount of from about 0.1 to about 5 percent by weight of the washing composition.

89. An ink composition according to claim 62 wherein the salt contains anions selected from the group consisting of chloride, bromide, iodide, carboxylate, sulfate, acetate, propionate, hexane sulfonate, carbonate, formate, nitrate, perchlorate, acetylacetonate, squarate, and mixtures thereof.

90. A process according to claim 79 wherein the dianionic surfactant has alkali metal counterions.

\* \* \* \* \*